Patented Dec. 10, 1935

2,024,106

UNITED STATES PATENT OFFICE 2,024,106

PREPARATION OF FLUORESCENT AND POUR POINT REDUCING BODIES FROM PETROLEUM RESIDUE

Harry Levin, Beacon, N. Y., assignor to The Texas Company, New York, N. Y., a corporation of Delaware No Drawing. Application August 22, 1933, Serial No. 686,252

17 Claims. (Cl. 196—13)

This invention relates to the preparation of fluorescent and wax pour-inhibiting bodies from petroleum residues, and more particularly to their preparation from cracking still residues.

The invention contemplates a process of preparing from cracking still residues a material in substantially powdery form having pour-depressing and color-imparting characteristics when mixed with mineral lubricating oils in relatively small proportions.

It has been found that certain bodies having pour-depressing and color-imparting qualities, when mixed with mineral lubricating oils, can be prepared from cracking still residues, particularly the tarry residue produced when cracking petroleum oils for the production of motor fuels. This material may be obtained as a conversion product of a cracking still residue by subjecting the residue to additional cracking or recracking to form a high melting point pitch-like body containing the desired constituents. These desired constituents are then extracted from the pitch with a solvent and recovered in a substantially solid form.

The carbonaceous material obtained in this manner is adapted to be dissolved in mineral lubricating oil fractions and when so dissolved imparts thereto a desired green fluorescent color to lubricating oil stocks derived from certain crude sources and which are normally deficient in this respect. This desired green fluorescence is characterized by the oil having a red color when viewed by transmitted light, and a green color when viewed by reflected light.

In addition, this material also possesses the property of depressing the pour point of wax-bearing oils derived from mixed-base and paraffin-base crudes.

In accordance with the method of my invention, this material, having the foregoing desirable characteristics, may be obtained from a cracking still residue in a substantially dry or powdery form. The preparation of the material in this form is of advantage since the material is in a concentrated form and free from other undesired constituents or impurities, thus facilitating its addition to mineral lubricating oil fractions in carefully controlled amounts in order to readily produce the particular degree of treatment required.

The method of preparation is as follows: The cracking still residue, such as that resulting from the cracking of petroleum oil, is subjected to further cracking at temperatures of about 850° to around 1000° F. and under pressures which may range from substantially above atmospheric to 400 pounds or higher. The particular temperatures and pressures employed, as well as the duration of the time to which the residue is subjected to cracking conditions, will depend upon the nature of the residue. Usually, these conditions are regulated so as to convert the residue into a pitchy body comprising about 60% of the original cracked residue. The resulting pitch is substantially solid at ordinary temperatures, with a ball-and-ring melting point, for example, of around 170° F., and containing the desired pour-depressing and color-imparting bodies.

This pitch, while in a fluid condition, is mixed with, and dissolved in a solvent oil, advantageously corresponding to a mineral lubricating oil fraction in boiling range and viscosity range. The pitch and solvent oil may be mixed in proportions varying from 5 to 50 volumes of pitch to about 100 volumes of oil. Although it is not wholly necessary, nevertheless it is usually advantageous to add to this mixture a solid absorbent catalytic material, such as an acid-treated clay, for example, in the proportion of about 10 to 45 pounds per barrel of mixture. The adsorbent material serves to remove certain undesired tarry constituents. Other catalytic materials of the nature of diatomaceous earth or fuller's earth may be employed.

The resulting mixture is heated to temperatures of around 300° to 400° F. but usually about 320° F. in order to effect extraction of the desired constituents from the pitch. This extraction may also be carried out in the presence of steam if desired, and the heating many be prolonged over a short period of time as, for example, around 30 or 60 minutes. Following this, the hot mixture is filtered to remove the solid and insoluble matter and produce a filtrate comprising the solvent oil and dissolved constituents extracted from the pitch.

This filtrate is then diluted with a light petroleum fraction, such as naphtha or gasoline. In some instances, it may be desirable to use a closely fractionated gasoline, preferably of a saturated nature, as, for example, hexane. The filtrate may be mixed with the naphtha or gasoline in the proportions of about one part of filtrate to twenty-five parts of naphtha or gasoline. Upon dilution, a powdery precipitate of brown color is formed which comprises constituents having the desired characteristics and substantially free from other undesired bodies extracted from the pitch. This precipitate may be removed from the dilute solution by filtration, centrifuging, or by other mechanical means.

If desired, the filtrate of solvent oil and extracted constituents removed from the pitch may be subjected to concentration prior to dilution with the naphtha or gasoline. Thus, the filtrate may be subjected to vacuum distillation wherein the bulk of the solvent oil is removed, leaving a residual fraction rich in extracted matter. This residual fraction may then be diluted with the naphtha or gasoline in somewhat smaller proportions in order to precipitate the desired constituents in a powdery form.

The product of my invention, therefore, is substantially completely soluble in lubricating oil fractions of mineral oil but substantially insoluble in naphtha and gasoline fractions.

The cracking still residue or cracked petroleum tar referred to above comprises the residual tars produced in the ordinary liquid or vapor phase cracking of mineral oil for the production of gasoline. The invention, however, is not necessarily restricted to this particular material as a source for the product of this invention. Other source material may, for example, comprise the extract materials separated from petroleum fractions, particularly lubricating oil fractions, during the refining of such fractions with solvents such as furfural, liquid sulphur dioxide and the like. The polymerized material removed from cracked naphtha, by treatment with a catalytic adsorbent clay, may also be utilized. These extract residues, however, like the cracking still residues, usually require further cracking in order to convert them to a form which contains substantial amounts of the desired constituents.

Obviously many modifications and variations of the invention, as hereinbefore set forth, may be made without departing from the spirit and scope thereof, and therefore only such limitations should be imposed as are indicated in the appended claims.

I claim:

1. The method of preparing from cracking still residues a material having desired pour-depressing and color-imparting characteristics when added to mineral lubricating oil, which comprises extracting the residue with a solvent comprising a mineral oil fraction of higher boiling range than petroleum naphtha to dissolve from the residue a fraction rich in the desired constituents, removing the solvent and dissolved material, diluting the thus removed solution with petroleum naphtha to precipitate the desired constituents in a substantially solid form, and removing the precipitate thus formed.

2. The method of preparing from cracking still residues a material having desired pour-depressing and color-imparting characteristics when added to mineral lubricating oil, which comprises extracting the residue with a solvent comprising a mineral lubricating oil fraction to dissolve from the residue a fraction rich in the desired constituents, removing the solvent and dissolved material, subjecting the resulting solution to distillation to remove the bulk of the solvent oil and produce a concentrated solution of the desired constituents, diluting the concentrated solution with petroleum naphtha to precipitate the desired constituents in a substantially solid form, and removing the precipitate thus formed.

3. The method of preparing from cracking still residues a material having desired pour-depressing and color-imparting characteristics when added to mineral lubricating oil comprising extracting the residue at a temperature of from 300° to 400° F. with a mineral lubricating oil fraction to dissolve from the residue a fraction rich in the desired constituents, removing the solvent and dissolved material, diluting the thus removed solution with petroleum naphtha to precipitate the desired constituents in a substantially solid form, and removing the precipitate thus formed.

4. The method of preparing from cracking still residues a material having desired pour-depressing and color-imparting characteristics when added to mineral lubricating oil comprising extracting the residue with a mineral lubricating oil fraction at elevated temperature in the presence of a solid, comminuted adsorbent material to dissolve from the residue a fraction rich in the desired constituents, removing the solvent and dissolved material, diluting the thus removed solution with petroleum naphtha to precipitate the desired constituents in a substantially solid form, and removing the precipitate thus formed.

5. The method of preparing from cracking still residues a material having desired pour-depressing and color-imparting characteristics when added to mineral lubricating oil comprising subjecting the residue to cracking to convert it into a high melting point pitch, extracting the pitch with a mineral lubricating oil fraction to dissolve from the pitch a fraction rich in the desired constituents, removing the solvent and dissolved material, diluting the thus removed solution with petroleum naphtha to precipitate the desired constituents in a substantially solid form, and removing the precipitate thus formed.

6. The method of preparing from cracking still residues a material having desired pour-depressing and color-imparting characteristics when added to mineral lubricating oil comprising subjecting the residue to cracking to convert it into a high melting point pitch, extracting the pitch with a mineral lubricating oil fraction at elevated temperature and in the presence of a solid comminuted adsorbent material to dissolve from the residue a fraction rich in the desired constituents, removing the solvent and dissolved material, diluting the thus removed solution with petroleum naphtha to precipitate the desired constituents in a substantially solid form, and removing the precipitate thus formed.

7. A solid carbonaceous material having pour-depressing and color-imparting characteristics when mixed with mineral lubricating oil, derived from cracking still residue, and which is soluble in mineral lubricating oil but substantially insoluble in petroleum naphtha.

8. A solid carbonaceous material having pour-depressing and color-imparting characteristics when mixed with mineral lubricating oil, prepared from pitch derived by recracking cracking still residues, and which is soluble in mineral lubricating oil but substantially insoluble in petroleum naphtha.

9. A solid carbonaceous material having pour-depressing and color-imparting characteristics when mixed with mineral lubricating oil, derived from petroleum residues, and which is soluble in mineral lubricating oil but substantially insoluble in gasoline.

10. The method of preparing a carbonaceous material having concentrated pour-depressing and color-imparting characteristics when added to mineral lubricating oil, which comprises recracking a cracking still residue, extracting the recracked residue with a mineral oil fraction of higher boiling range than petroleum naphtha, separating the extract from the undissolved residue, diluting the separated extract with petroleum naphtha to precipitate the desired constituents, and removing the precipitate thus formed.

11. The method of preparing a carbonaceous material having concentrated pour-depressing and color-imparting characteristics when added to mineral lubricating oil, which comprises recracking a cracking still residue to a pitch, extracting the resultant pitch with a mineral lubricating oil fraction, separating the extract from the undissolved pitch, distilling the extract to remove a portion of the solvent oil and produce a concentrated solution of the desired constituents, diluting the concentrated solution with petroleum naphtha to precipitate the desired constituents, and removing the precipitate thus formed.

12. The method of preparing a carbonaceous material having desired pour-depressing and color-imparting characteristics when added to mineral lubricating oil, which comprises recracking a cracked petroleum tar to a solid pitch, extracting the pitch at an elevated temperature with a mineral lubricating oil in the presence of a comminuted adsorbent material, separating the extract from the undissolved pitch and adsorbent material, diluting the extract with petroleum naphtha to precipitate the desired constituents, and removing the precipitate thus formed.

13. A solid carbonaceous material having pour-depressing and color-imparting characteristics when mixed with mineral lubricating oil, comprising the powdery precipitate obtained on naphtha dilution of a heavier petroleum oil extract of a recracked cracking still residue.

14. A solid carbonaceous material having pour-depressing and color-imparting characteristics when mixed with mineral lubricating oil, comprising the powdery precipitate obtained on naphtha dilution of a mineral lubricating oil extract of a pitch derived by recracking a cracked petroleum tar.

15. A mineral lubricating oil of low pour point comprising a wax bearing mineral lubricating oil admixed with a relatively small proportion of a precipitate obtained on naphtha dilution of a heavier petroleum oil extract of a recracked cracking still residue.

16. A mineral lubricating oil of low pour point comprising a wax bearing mineral lubricating oil admixed with a relatively small proportion of a precipitate obtained on naphtha dilution of a mineral lubricating oil extract of a pitch derived by recracking a cracked petroleum tar.

17. A solid carbonaceous material having pour-depressing characteristics when mixed with mineral lubricating oil, derived from petroleum residue, and which is substantially completely soluble in mineral lubricating oil but substantially completely insoluble in gasoline.

HARRY LEVIN.